Figure 7:
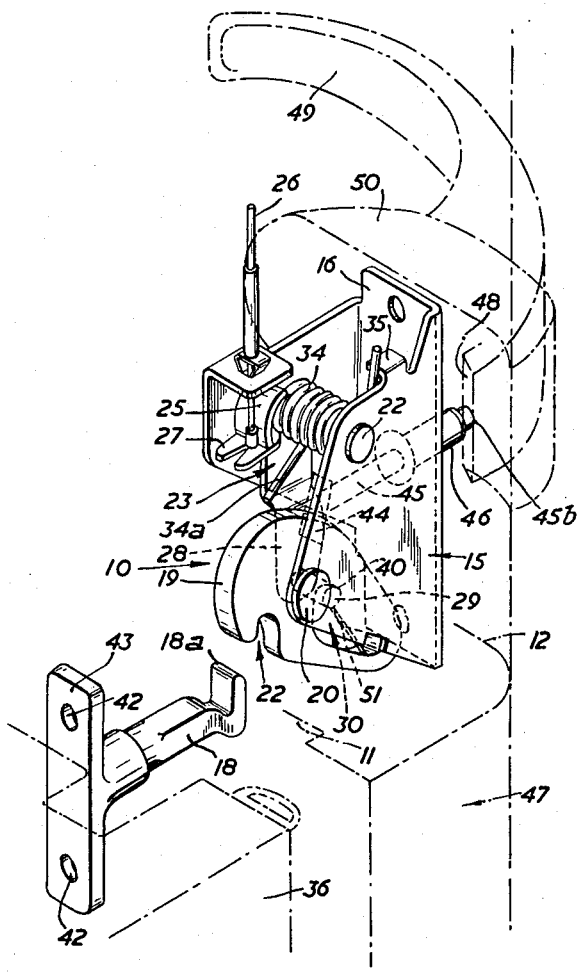

Nov. 22, 1960  H. JAKEMAN ET AL  2,961,265
LATCHING MECHANISMS
Filed Oct. 7, 1957  9 Sheets-Sheet 1
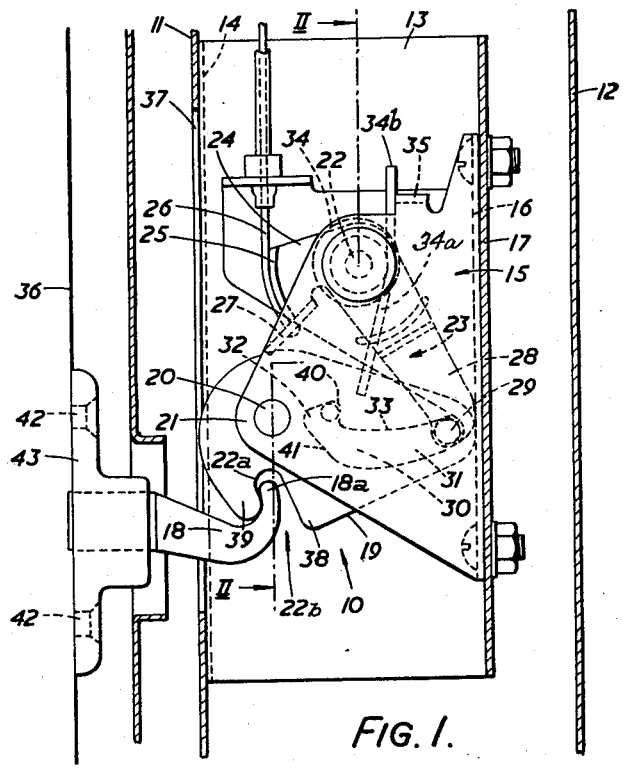
FIG. 1.
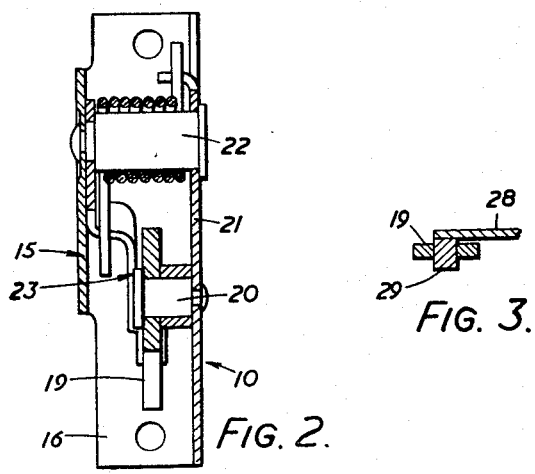
FIG. 2.
FIG. 3.
INVENTORS
HARRY JAKEMAN
PHILIP SWINGEWOOD JEAVONS
BY Irwin S. Thompson
ATTORNEY

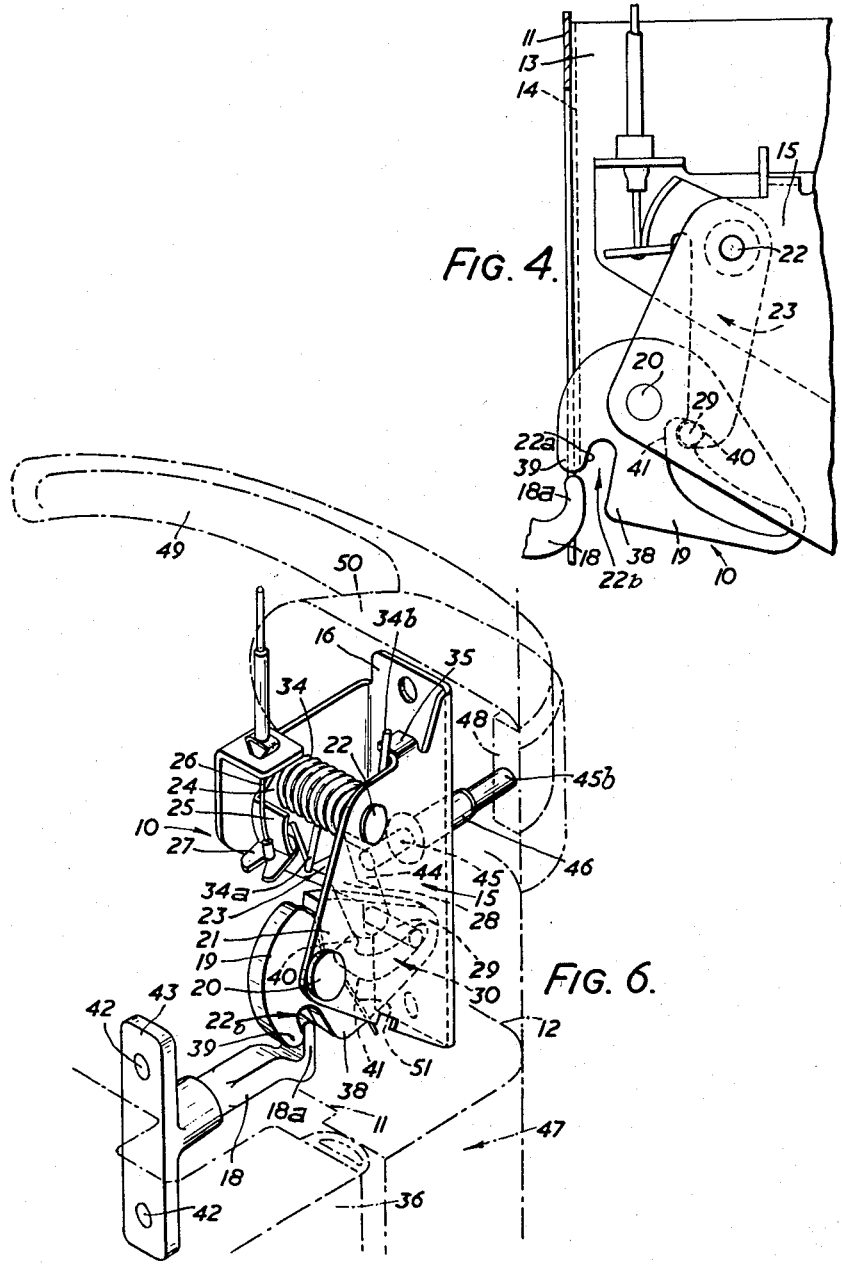

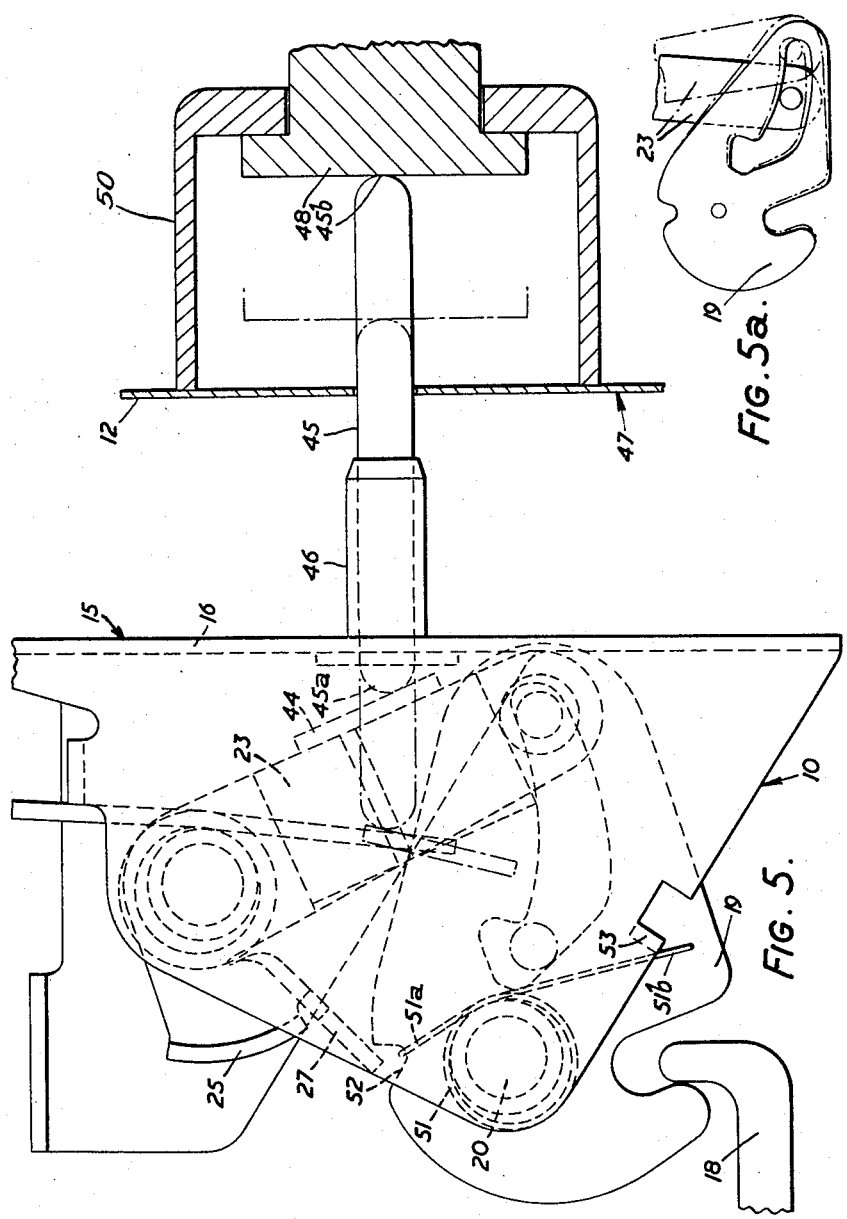

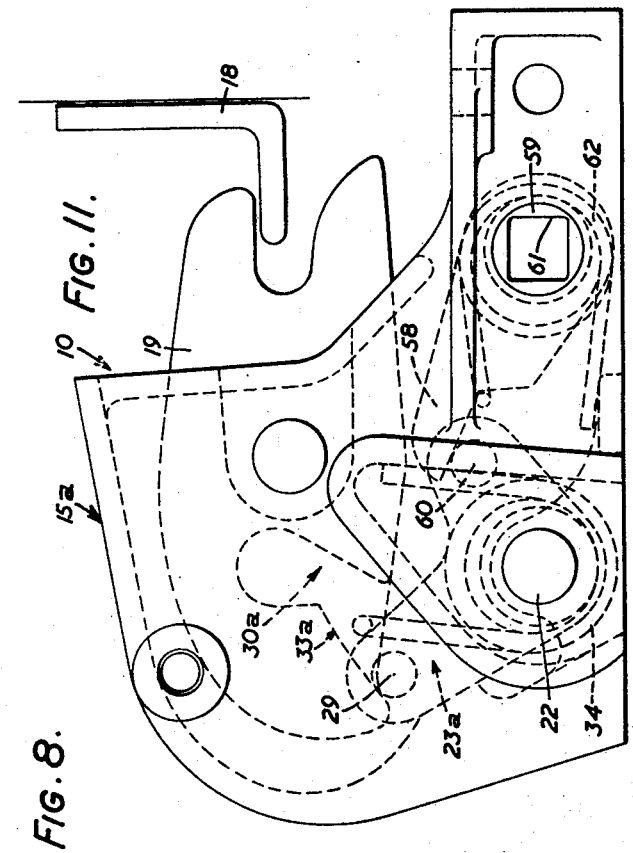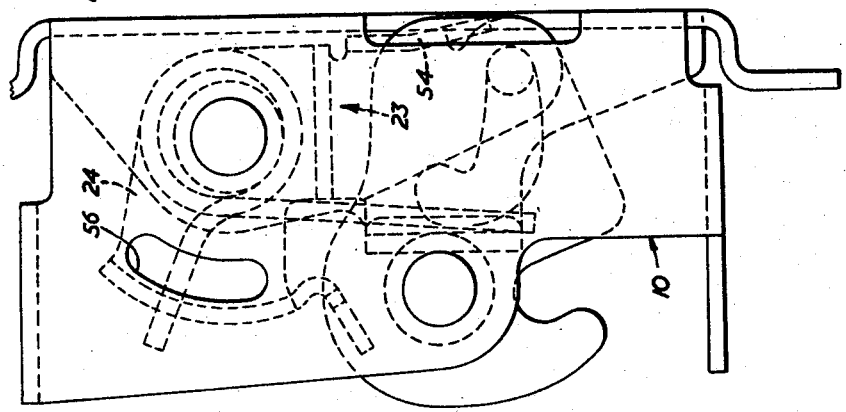

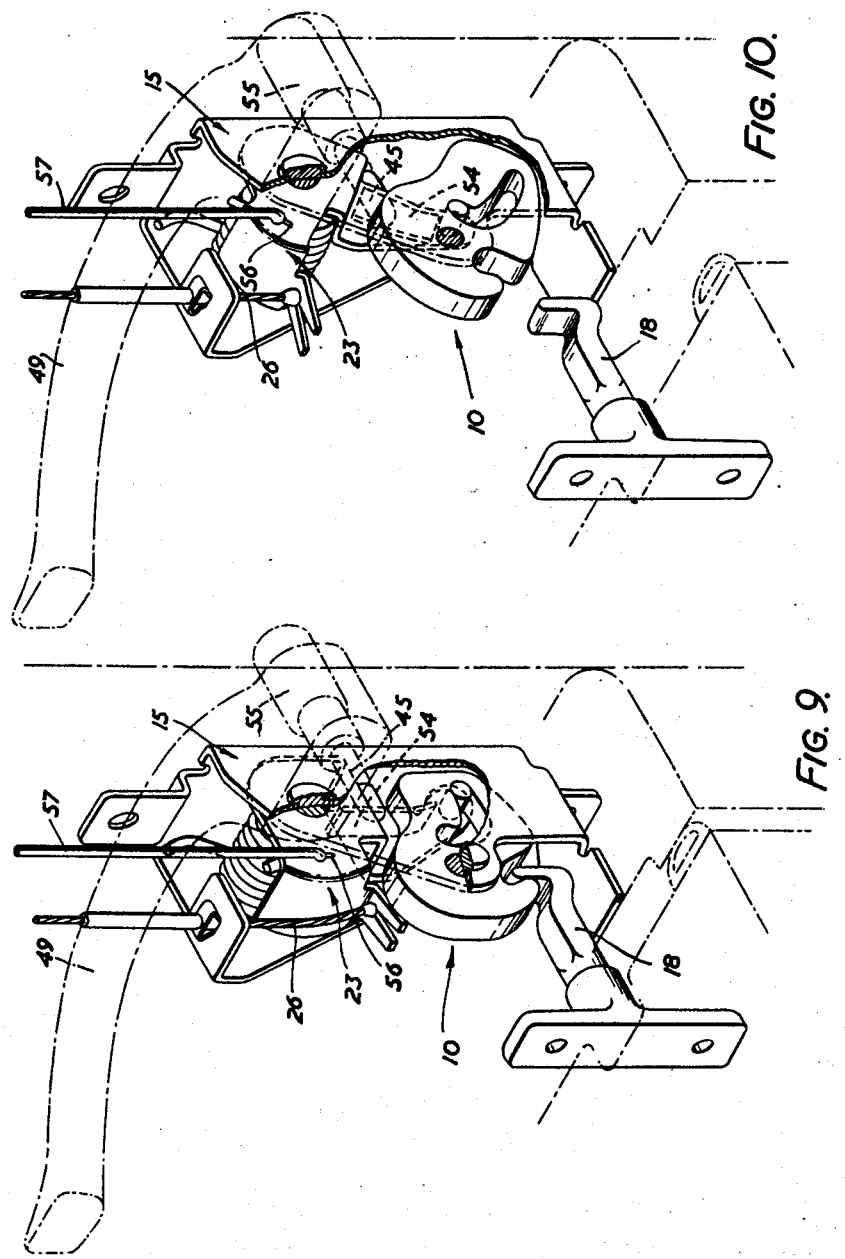

Nov. 22, 1960   H. JAKEMAN ET AL   2,961,265
LATCHING MECHANISMS

Filed Oct. 7, 1957   9 Sheets-Sheet 7

INVENTORS
HARRY JAKEMAN
PHILIP SWINGEWOOD JEAVONS
BY Irwin S. Thompson
ATTORNEY

Nov. 22, 1960     H. JAKEMAN ET AL     2,961,265
LATCHING MECHANISMS

Filed Oct. 7, 1957     9 Sheets-Sheet 8

INVENTORS
HARRY JAKEMAN
PHILIP SWINGEWOOD JEAVONS
BY *Irwin S. Thompson*
            ATTORNEY Nov. 22, 1960 H. JAKEMAN ET AL 2,961,265
LATCHING MECHANISMS
Filed Oct. 7, 1957 9 Sheets-Sheet 9

INVENTORS
HARRY JAKEMAN
PHILIP SWINGEWOOD JEAVONS
BY Irwin S. Thompson
ATTORNEY

# United States Patent Office 2,961,265
Patented Nov. 22, 1960

2,961,265

LATCHING MECHANISMS

Harry Jakeman and Philip Swingewood Jeavons, Birmingham, England, assignors to Wilmot-Breeden Limited, Birmingham, England Filed Oct. 7, 1957, Ser. No. 688,693

Claims priority, application Great Britain Oct. 8, 1956

15 Claims. (Cl. 292—216)

This invention relates to latching mechanisms and more especially to latches for the doors of cabinets or the like where the door is required to compress or deflect a resilient seal when closing the door aperture, as for example in the case of refrigerator and cooker doors.

The main object of the invention is to provide a latching mechanism which is efficient in operation and yet embodies few parts, thereby rendering it simple and economical in production. Another object is to ensure that when applied to cabinet doors of the foregoing character, the latching mechanism acts to urge the door against the resilient door seal and automatically compensates for any loss of resilience in the seal. The invention further aims at providing a latching mechanism which while effective and positive in action will nevertheless be releasable with comparatively little effort, thereby enabling this operation to be effected, for example, by push-button.

A further object is to provide a new or improved latching mechanism comprising a latch member, an actuating member and a striker, said latch member being mounted for angular movement about a centre to enable it to enter into latching engagement with said striker and, when in the latching position, being restrained from such angular movement in an unlatching direction by the actuating member bearing against a surface of the latch member and away from which the actuating member is movable to free the latch member and enable it to turn from its latching to its fully unlatched position in which return movement of the actuating member to its original position is prevented by causing it to bear against another surface of the latch member.

The arrangement may be such that the actuating member in bearing upon said other surface of the latch member exerts a force on the latter passing substantially through the centre about which it is mounted for angular movement, and therefore exerts substantially no turning moment on the latch member.

Preferably the contact of the actuating member with said surface of the latch member is such as to afford a progressive wedging action between the actuating member and the latch member whereby a range of continuous positive latching positions of the latter results. Said surface of the latch member may be an external surface portion thereof or alternatively may be formed by an edge portion of an opening or recess formed within the latch member which is of plate-like form.

The aforesaid opening may be of substantially L shape, one limb of the opening being disposed substantially radially of the centre about which the latch member is angularly movable while the other is substantially arcuate with respect to such centre. The arrangement is preferably such that the latch member is disposed entirely between the inner and outer skins of the door to which the latch mechanism is fitted, with the striker passing through an aperture in the inner skin for engagement with the latch member.

Figure 13:
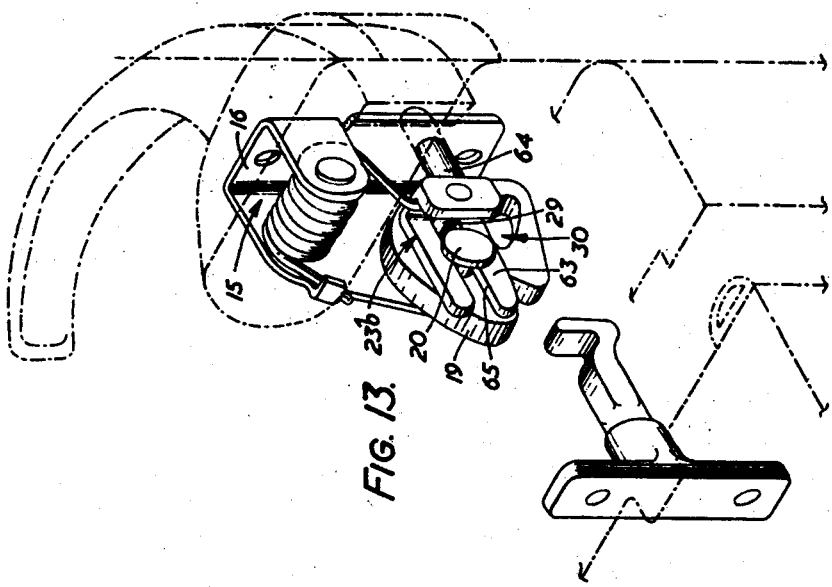
Figure 12:
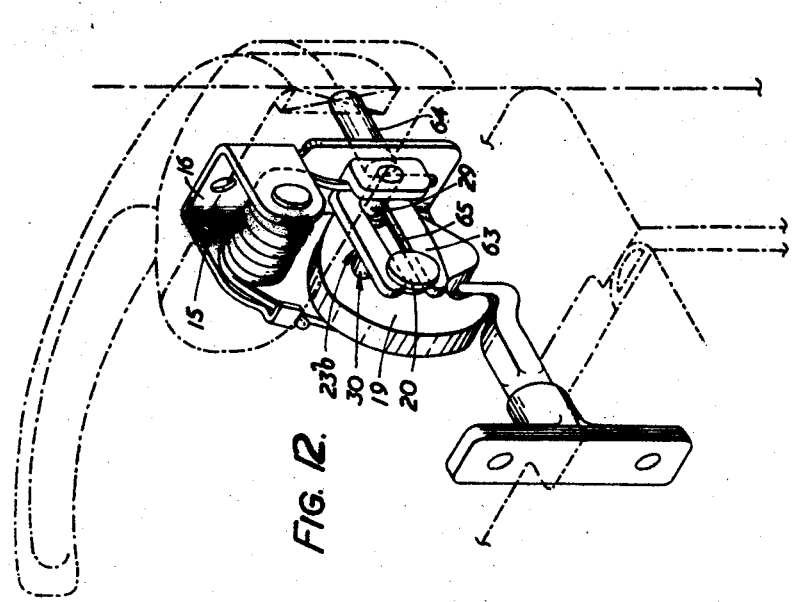
Figure 15:
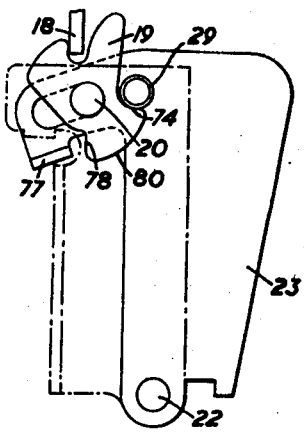
Figure 14:
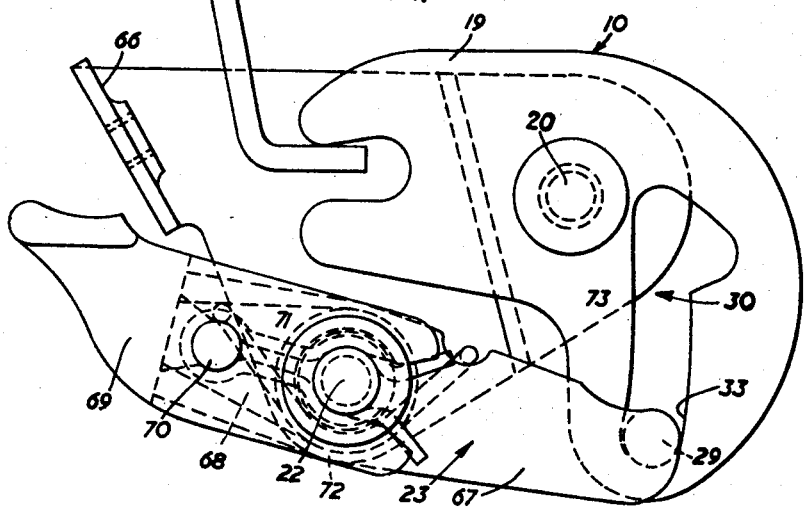
Figure 17:
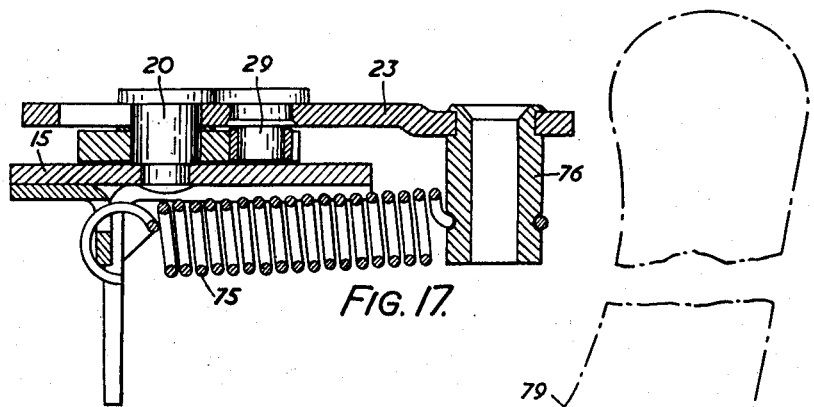
Figure 16:
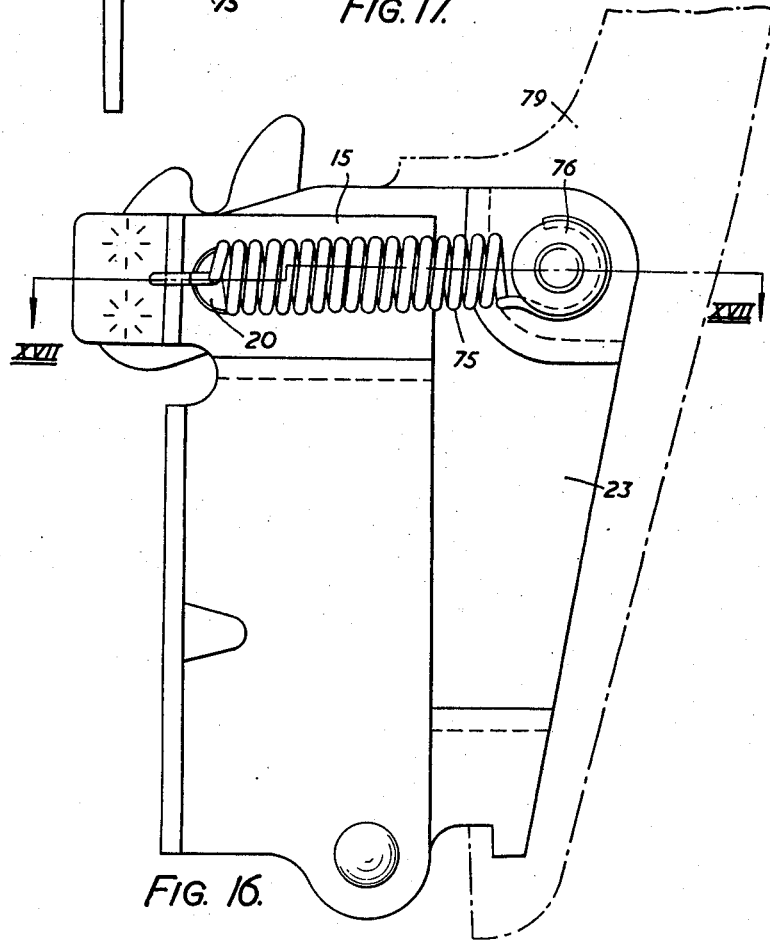

Various embodiments of latching mechanisms constructed in accordance with the invention will now be described, by way of example, with reference to the accompanying drawings, in which like reference numerals are applied to like parts and wherein:

Figure 1 is a side elevation of one form of the latching mechanism in the latching position, the figure also showing parts of a refrigerator on which the latching mechanism is mounted, Figure 2 is a sectional view of the latching mechanism shown in Figure 1 on the line II—II of that figure, the striker being omitted, Figure 3 is a broken detail view, Figure 4 is a broken view of the latching mechanism shown in Figure 1 in the fully unlatched position, Figure 5 is a side elevation of a latching mechanism somewhat similar to that shown in the previous figures but having alternative means for unlatching the mechanism, Figure 5a is a detail view, Figures 6 and 7 are diagrammatic perspective views of the latching mechanism shown in Figure 5 in the latching and fully unlatched positions respectively, Figure 8 illustrates an arrangement of the latching mechanism shown in the previous figures modified to enable it to be released by three alternative methods, Figures 9 and 10 are perspective views respectively illustrating the mechanism shown in Figure 8 in the latching and fully unlatched positions, Figure 11 is a side elevation of an alternative form of latching mechanism, Figures 12 and 13 illustrate in perspective an embodiment of the latching mechanism in which linear movement of an actuating member is effected to free the latch member, the figures showing the mechanism in the latching and fully unlatched positions respectively, Figure 14 shows a latching mechanism in which the actuating member is operated by means of a finger pad which extends through the skin of the door, Figure 15 illustrates diagrammatically a latching mechanism suitable for employment with the oven door of a cooker, Figure 16 is a side elevation of the mechanism shown in Figure 15, and Figure 17 is a sectional view on the line XVII—XVII of Figure 16.

Referring to Figures 1 to 4 of the drawings, the latching mechanism 10 shown therein is suitable for use as a refrigerator latch and is illustrated as applied to a refrigerator cabinet, the mechanism being arranged near the free edge of the refrigerator door. The latching mechanism comprises a backplate 15 of channel section which extends between the inner and outer skins 11, 12 of the door and provides a mounting for the various parts of the mechanism with the exception of the striker 18. A latch member 19, which is of plate-like form and substantially pear-shaped, is mounted on a pivot pin 20, the mechanism as illustrated being arranged so that the axis of the pivot pin 20 is horizontal and substantially parallel to the inner skin of the door. The backplate 15 is mounted in a channel member 13 secured by flanges 14 at the free ends of its limbs to the inner skin 11 of the door. Only the remote limb of the channel member 13 is shown in Figure 1 for the sake of clarifying the drawing. The backplate 15 is secured by its transverse portion 16 to the corresponding transverse portion 17 of the channel member 13; the pivot pin 20 is secured to one limb 21 of the backplate 15. On the edge of the latch member 19 adjacent the striker 18 a substantially U-shaped recess 22b is formed, the sides of which are disposed more or less parallel with the inner and outer skins 11, 12 of the door, and nearer the former, when the latch member is in its latching position.

Also mounted on a pivot pin 22 extending between the limbs of the backplate 15 is a two-armed substantially L-shaped lever 23 which constitutes the actuating member of the latching mechanism 10. The shorter arm 24 of the lever 23 is bent inwardly to form an arcuate face 25 to support one end of a flexible actuating cable 26 by which the mechanism is turned to its fully unlatched position, the end of the cable adjacent the mechanism being anchored in a slot formed in an ear 27 arranged along one edge of the shorter arm 24. The opposite end of the cable, which is sheathed, is operated by means of a handle, not shown.

The other longer arm 28 of the actuating lever 23 has near its free end a pin 29 which lies in an opening or recess 30 formed in the latch member 19. The opening 30 is of substantially L shape with one of its limbs 31 disposed substantially radially with respect to the pivot pin 20 of the latch member 19 while the other limb 32, which extends from the inner end of the radial limb, is substantially arcuate with respect to such pivot. Forming the aforesaid surface of the latch member 19, the inner edge 33 of the substantially radial limb 31 of the opening or slot 30 is arcuate, the arc being struck from a point offset from the pivot 22 of the lever 23. The point from which the arc is struck is disposed on the side of the pivot 22 remote from the pivot pin 20. A torsion spring 34 is arranged around the pivot 22 of the lever 23 and has one leg 34a which lies against the edge of the lever while the other leg 34b bears against a lug 35 of the backplate 15 to provide a spring return for the lever.

The striker 18 is so mounted on the body portion 36 of the refrigerator as to have a portion of substantially L shape passing through an aperture 37 in the inner skin 11 of the door for engagement with the latch member 19 when the door is shut, the free end or short limb 18a of the L shape of the striker lying within the substantially U-shaped slot 22b in the latch member 19 with a portion 39 of the side 22a of the U shape lying nearer the inner skin 11 of the door bearing against the inner surface of the free end of the striker, as shown in Figure 1. It will be understood that with the door latched the pin 29 of the lever 23 lies in the substantially radial limb 31 of the opening or recess 30 in the latch member, having passed as far along said limb as possible towards its closed end and bearing against its arcuate inner edge 33 with a progressive wedging action to keep the side 22a of the U-shaped slot 22b bearing against the inner surface of the free end 18a of the striker in order to accommodate any loss of resilience in the door seal. The offsetting of the centre of curvature of the arcuate edge 33 with respect to the pivot of the lever is chosen to give the desired degree of wedging.

To form noses or pawl-like extremities the portions 38, 39 of the latch member 19 on each side of the U-shaped recess 22 are rounded and the portion 38 lying nearer the outer skin 12 of the door projects further from the pivot 20 of the latch member than the other portion 39 and nearer the longitudinal axis of the striker 18 when the latch member is turned about its pivot into the unlatching position shown in Figure 4. In such position the portion 38 lies in the path of the striker 18 during the door-closing movement so as to be struck thereby with resulting rotation of the latch member 19 into the latching position shown in Figure 1. In order to unlatch the latching mechanism 10 and open the door, tension is applied to the actuating cable 26 by the handle to turn the lever 23 about its pivot 22 which causes the lever pin 29 to move inwardly along the radial portion 31 of the opening or recess 30 to the point where the arcuate portion 32 extends therefrom. As a result the latch member 19 is freed and is turned about its pivot 20 by the restraint exerted by the free end 18a of the striker as the door is pulled open by the handle, the lever pin 29 moving along the arcuate portion 32 of the opening or recess 30 to the closed end of such arcuate portion, as shown in Figure 4.

With the parts in the foregoing position, return movement of the lever 23 is prevented since its pin 29 exerts a force passing substantially through the pivot 20 of the latch member. In order to avoid the possibility of the latch member 19 becoming displaced, with the door open, into a position in which it is incorrectly placed for latching engagement with the striker 18, the outer end of the arcuate portion 31 of the opening 30 is provided with a recess 40 into which the pin 29 moves under the loading of the spring 34 when the latch member is turned into its fully unlatched position. The inner edge 41 of the arcuate portion 31 of the opening 30 is inclined inwardly towards the pivot 20 so that operation of the lever 23 towards the unlatching position causes the pin 29 to make contact with the inclined edge 41 to turn the latch member 19 towards its fully unlatched position.

It will be appreciated that the arcuate face 25 on the shorter arm 24 of the lever 23 ensures a constant line of action for the flexible actuating cable 26 so that the latter, during operation of the mechanism, is not subjected to undue bending stress which might cause fatigue.

On door closure the rounded portion or nose 38 nearer the outer skin 12 of the door is struck by the striker 18 with sufficient force to overcome any tendency for the lever pin 29 to remain in the closed end of the arcuate portion 32 of the opening or recess 30, whereby the mechanism is tripped and angular movement of the latch member 19 commences and continues until the lever pin enters into wedging engagement with the arcuate inner edge 33 of the radial limb 31 of the opening or recess. Retardation of the door, due to the reaction of its resilient seal, causes the inertia of the lever 23 to drive the lever pin 29 along the wedging face 33 of the opening or recess 30, and it will be understood that the further the pin travels along this arcuate inner edge the more firmly the door is pulled against its seal. Accordingly a continuous range of positive latching positions is provided which enables progressive loss of resilience of the door seal to be automatically taken up.

To provide the most advantageous seal conditions the striker 18 is adjustably mounted on the body portion 36 of the refirgerator so that its position along the axis of engagement can be adjusted, for example by providing the body portion with slots to receive screws passing through holes 42 in the foot 43 of the striker. The best seal conditions accrue when, with the door closed, the lever pin 29 makes contact with the wedging face 33 of the latch member 19 at a point such that sufficient force is achieved to provide a good seal whilst still ensuring that some "pull in" movement of the latch member still remains available to accommodate any settling of the seal. In the present embodiment, which is suitable for a large refrigerator cabinet, a "pull in" movement of approximately ⅜₁₆" is provided to accommodate the greater degree of twist associated with a large door. It will be appreciated that the "pull in" characteristic of the latching mechanism is controlled by the design of the wedging face 33 and the strength of the spring 34.

Figures 5, 5a, 6 and 7 illustrate a latching mechanism substantially similar to that already described but having alternative means for operating the mechanism. In addition to being adapted for cable operation by means of the ear 27 and arcuate face 25, the actuating lever 23 is provided with an inclined face 44 on the side thereof adjacent the transverse portion 16 of the backplate 15, such transverse face cooperating with the inner end 45a of a plunger 45 slidably mounted in a bush 46 carried by the backplate. The outer end 45b of the plunger 45 passes through the outer skin 12 of the door 47 and is in contact with one end 48 of a horizontally arranged lever handle 49 pivotally carried by a mounting 50 secured to the outer surface of the door. Operation of the handle 49 from the position shown in Figure 6 to the position shown in Figure 7 to open the door 47 causes the end 48 of the handle to press the plunger 45 inwardly to unlatch the mechanism. Figures 6 and 7 show both the handle 49 and the cable 26 for operating the mechanism 10 but this is by way of example only and it will be understood that only one or other method of operation need be provided. A torsion spring 51 mounted on the pivot 20 is provided to urge the latch member 19 into the correct angular position for engagement with the striker 18 when the door 47 is open, one projecting end 51a of the spring engaging with a notch 52 in the edge of the latch member whilst the opposite projecting end 51b of the spring abuts a lug 53 of the backplate 15. The extent of the "pull in" movement of the latch member 19 is shown in Figure 5a, the latch member moving from the position shown in full lines to the position shown in broken lines during the "pull in" movement.

An alternative form of latching mechanism modified so as to be capable of being unlatched by three alternative methods is illustrated in Figures 8, 9 and 10. The actuating lever 23 carries a transversely arranged plate 54 adapted to cooperate with a plunger 45, Figures 9 and 10, to unlatch the mechanism in the manner already described. The plunger 45 may be operated by means of a pivoted handle 49 or alternatively the plunger may be the shaft of a push-button 55. Release of the mechanism may also be effected by means of a flexible cable 26. To provide an alternative to the cable form of release an elongated arcuate slot 56 is provided in the shorter arm 25 of the actuating lever 23 to accept the inwardly turned enlarged end of a rigid link member 57 by which unlatching may be effected by means of a remote control handle, not illustrated. The arcuate slot permits the remote control handle to return to its original position without moving the mechanism to its latching position.

Figure 11 illustrates an alternative embodiment in which the actuating lever 23a is in the form of a bell crank arranged on a pivot pin 22 and loaded in an anti-clockwise direction about the pivot pin by means of a torsion spring 34. The recess 30a in the latch member 19 is open-ended and the pin 29 of the actuating lever 23a cooperates with an edge 33a of the recess to exert a progressive wedging action on the latch member. Operation of the actuating lever 23a to unlatch the mechanism is effected by an arm 58 rigidly mounted on a pivot 59 rotatably carried by the backplate 15a, the outer end of such arm cooperating with a further pin 60 carried by the bell crank 23a. An axially arranged bore 61 of square cross-section is provided in the pivot 59 to accept one end of a square rod by means of which the arm 58 may be turned in an anti-clockwise direction to unlatch the mechanism, the opposite end of such rod, which lies substantially parallel to the door of the refrigerator, being secured to an operating handle disposed either above or below the latching mechanism 10. The arm 58 and pivot 59 are loaded in a clockwise direction by means of a torsion spring 62 so that the arm returns to the latching position when the handle is released.

In the arrangement shown in Figures 12 and 13 linear movement of the actuating member is effected to free the latch member instead of angular movement about a centre as in the embodiments already described. The latch member 19 is mounted on a pivot pin 20 carried by the backplate 15 and the actuating member 23b comprises a plate-like inner portion 63 the inner end of which is of channel section and is fixedly secured to an operating plunger 64 which is slidably mounted in an aperture formed in the transverse portion 16 of the backplate. An open-ended slot 65 is formed in the inner portion 63 through which the projecting headed end of the pivot pin 20 passes and the pin 29 of the actuating member 23b is carried by the inner end of the inner portion 63 of the latter and projects into the opening or recess 30 in the latch member 19, the shape of such opening or recess being substantially as in the previously described embodiments.

The latching mechanism illustrated in Figure 14 is adapted to be mounted within the space formed between the inner and outer skins of a refrigerator door near the free edge of the latter, as in the previously described embodiments, such free edge being, however, formed with a recess to provide a finger grip. A flange 66 of the backplate 15 is secured to the inner surface of the wall of such recess to retain the mechanism 10 in position. The actuating member 23 is in the form of a two-armed lever mounted on a pivot pin 22 and the longer arm 67 of which carries the pin 29 which cooperates with the opening or recess 30 in the latch member 19 whilst the shorter arm 68 of the lever is provided with a separately formed finger pad 69 which extends through a slot in the wall of the recess. At its inner end the finger pad 69 is connected to the actuating lever 23 about a pin 70 by means of a retaining clip 71. A torsion spring 72 loads the lever 23 in a clockwise direction. The arrangement of the pivot pins 20, 22 and the shape of the opening or recess 30 is such that movement of the actuating lever 23 in an anti-clockwise direction to free the latch member 19 causes the pin 29 to leave its wedging engagement with the edge 33 of the opening or recess 30 and make contact with the opposite edge 73 of the latter to cause angular movement of the latch member about its pivot pin 20 towards the fully unlatched position.

Figures 15, 16 and 17 illustrate a latch mechanism suitable for employment with an oven door and in which the pin 29 carried by the actuating member 23 bears against an external surface 74 of the latch member 19 to restrain angular movement in an unlatching direction and exert a "pull in" effect. The latch member 19 is mounted on a pivot 20 carried by the backplate 15 and a tension spring 75 extending between a stud 76 secured to the actuating member 23 and the backplate loads the actuating member inwardly. When the latch member 19 is moved to the fully unlatched position the pin 29 of the actuating member 23 bears against an arcuate external surface 80 of the latch member to avoid the latch member becoming displaced when the door is open. An inwardly turned lug 77 on the actuating member 23 lies in the plane of the latch member 19 so that, should the latter be turned to the latching position whilst the door is open, movement of the actuating member to free the latch member brings the lug into contact with a shoulder 78 on the latch member to re-set the latter to the correct position for engagement with the striker 18. A handle 79 which projects through the outer skin of the door is secured to the actuating member 23 to operate the latter. It will be appreciated that the surface 74 of the latch member, owing to its short length and shallow angle, provides only a small degree of "pull in" to suit the stiffness of the metal sealing strip employed with an oven door.

In all cases movement of the parts to the latching position occurs under the inertia of the actuating member. Thus, in the case of a push-button actuating member, the inertia of the spring loading the push-button overcomes the inertia of the push-button in the opposite direction, and this to a degree comparable with the inertia of the actuating member in those embodiments where there is no spring loading or where the spring loading acts in the same direction as the inertia.

In most of the embodiments chosen for description wedging movement of an actuating member occurs in an angular sense against an arcuate surface, but it will be appreciated that in other forms of the latching mechanism the wedging may be effected by linear movement of the actuating member along a rectilinear surface sloping at an angle to the line of movement of the actuating member less than the friction angle between the actuating member and the surface. In the case of the angular wedging movement described, the degree of offset of the centre of curvature of the arcuate edge of the opening or recess with respect to the pivot of the lever is limited to give the same effect.

It will be seen that the mechanism is self-locking in both directions, that is to say the actuating member is locked against return when it has been operated to enable the latch member to be moved to the unlatching position and such movement has occurred, and the latch member is similarly locked against return movement to the unlatching position through the intermediary of the striker when it has been tripped and turned by the latter into the latching position.

We claim:

1. A latching mechanism comprising in combination a latch member, an actuating member, spring means constantly urging said actuating member in one direction, and a striker, said latch member being mounted for angular movement about an axis to enable it to enter into latching engagement with said striker and, when in the latching position, being restrained from such angular movement in an unlatching direction by the actuating member bearing under the influence of said spring means against a surface portion of the latch member away from which surface portion the actuating member is movable to re-engage with the latch member and positively turn the latter from its latching to its fully unlatched position in which return movement of the actuating member to its original position is prevented by causing it to bear under the influence of said spring means against another surface portion of the latch member.

2. A latching mechanism comprising in combination a latch member, an actuating member, a spring means constantly urging said actuating member in one direction, a striker, said latch member being mounted for angular movement about an axis to enable it to enter into latching engagement with said striker and, when in the latching position, being restrained from such angular movement in an unlatching direction by the actuating member bearing under the influence of said spring means against a first surface portion of the latch member, and release means operable to move said actuating member away from said first surface portion of the latch member to free the latter and cause the actuating member to bear on a second surface portion of the latch member to cause angular movement of the latter about said axis from its latching to its fully unlatched position in which return movement of the actuating member to its orignal position upon release of said release means is prevented by causing it to bear under the influence of said spring means against a third surface portion of the latch member.

3. A latching mechanism according to claim 2, wherein the actuating member is spring loaded by said spring means so that a portion thereof which bears against said first surface portion of the latch member is urged away from said axis, and said third surface portion of the latch member is formed with a recess in which a portion of the actuating member engages under the influence of said spring loading, when the latch member is moved into its fully unlatched position and said release means are released, to avoid the possibility of the latch member becoming displaced, when a door with which the mechanism is associated is open, into a position in which it is incorrectly placed for latching engagement with the striker.

4. A latching mechanism according to claim 3, wherein movement of the latch member into latching engagement with the striker trips the mechanism and frees the actuating member from contact with said third surface portion of the latch member, and movement of the actuating member towards the position in which it bears against said first surface portion of the latch member occurs under the inertia of the actuating member.

5. A latching mechanism comprising in combination a latch member, an actuating member, spring means constantly urging said actuating member in one direction, and a striker, said latch member being mounted for angular movement about an axis to enable it to enter into latching engagement with said striker and, when in the latching position, being restrained from such angular movement in an unlatching direction by the actuating member bearing under the influence of said spring means against a first surface portion of the latch member, and means operable to move said actuating member away from said surface portion of the latch member to free the latter, said latch member having a second surface portion on which said actuating member can be brought to bear to cause angular movement of the latch member about said axis from its latching to its fully unlatched position in which return movement of the actuating member to its original position upon release of said means is prevented by causing it to bear against a third surface portion of the latch member, such return movement being produced during a latching operation by engagement of said latch member and striker to trip the mechanism.

6. A latching mechanism according to claim 5, wherein the angle between said first surface portion of the latch member and the path followed by a portion of the actuating member which makes contact with said first surface portion in being brought to bear against the latter is small in order to afford a progressive wedging action between the actuating member and the latch member to provide a continuous range of positive latching positions of the latter.

7. A latching mechanism according to claim 5, wherein said restraint against angular movement in an unlatching direction of the latch member is effected by relative movement between a portion of the actuating member which, during said relative movement, bears against said first surface portion and the latch member at an angle less than the friction angle so that the latch member is irreversibly locked in its latching position by the actuating member.

8. A latching member according to claim 5, wherein said first surface portion and said second and third surface portions of the latch member are each formed by an edge portion of an opening formed within the latch member which is of plate-like form.

9. A latching mechanism according to claim 5, wherein said latch member is of plate-like form and an opening of substantially L-shape is formed in the latch member, one limb of the opening being disposed substantially radially of said axis whilst the other limb of the opening is disposed at the end of the radial limb adjacent said axis, said first surface portion of the latch member being formed by an edge portion of the radially disposed limb on the side thereof from which the other limb projects while said second and third surface portions are formed by the inner and outer side edge portions of said other limb respectively.

10. A latching mechanism according to claim 9, wherein said side edge portions of said other limb diverge from the point of intersection of the limbs of the L-shaped openings so that the end of said other limb remote from said limb is wider than the end at the junction of the limbs.

11. A latching meachanism according to claim 5, and further comprising a pivot spaced from said axis and on which said actuating member is mounted for angular movement, said first surface portion of the latch member being arcuate and the arc being struck from a point offset from said pivot when the latch member and actuating member are in the latching position.

12. A latching mechanism according to claim 5, and further comprising a pivot spaced from said axis and on which said actuating member is mounted for angular movement, said first surface portion of the latch member being arcuate and the arc being struck from a point offset from said pivot on the side of the pivot remote from said axis when the latch member and actuating member are in the latching position.

13. A latching mechanism according to claim 5, wherein the actuating member comprises a lever and the latching mechanism further comprises a pivot on which said lever is mounted for angular movement, and means for swinging said lever about the pivot towards said axis in order to turn the latch member towards the unlatching position, said lever having a portion offset from said pivot which projects transversely from the lever to engage with said surface portions of the latch member.

14. A latching mechanism according to claim 13, wherein said unlatching means for swinging said lever comprise a flexible cable one end of which is attached to said lever which is provided with an arcuate face to support the flexible cable and avoid undue bending stresses thereon.

15. A latching mechanism comprising in combination a latch member pivoted about an axis, an actuating member pivoted about an axis offset from said axis, means for swinging said actuating member about said offset axis so that its free end moves towards said axis, and a striker, said latch member being capable of angular movement about said axis to enable it to enter into latching engagement with said striker and, when in the latching position, being restrained from such angular movement in an unlatching direction by a portion of the actuating member towards the free end thereof bearing against a first surface portion of the latch member, operation of said means causing angular movement of said actuating member about said offset axis to move said portion of the actuating member away from said first surface portion so that it can bear on a second surface portion of the latch member to cause angular movement of the latter about said axis from its latching to its fully unlatched position in which return of the actuating member to its original position upon release of said means is prevented by causing said portion of the actuating member to bear against a third surface portion of the latch member.

References Cited in the file of this patent

UNITED STATES PATENTS

| | | |
|---|---|---|
| 2,074,244 | Thurber | Mar. 16, 1937 |
| 2,745,132 | Clark et al. | May 15, 1956 |
| 2,767,007 | Burke | Oct. 16, 1956 |
| 2,789,023 | Johnson | Apr. 16, 1957 |
| 2,789,852 | Eads | Apr. 23, 1957 |
| 2,867,465 | Van Noord | Jan. 6, 1959 |